United States Patent
West et al.

(10) Patent No.: US 6,290,001 B1
(45) Date of Patent: Sep. 18, 2001

(54) METHOD AND COMPOSITION FOR SWEEP OF CUTTINGS BEDS IN A DEVIATED BOREHOLE

(75) Inventors: Gary C. West, Spring, TX (US); Rob Valenziano, Slidell; Karl A. Lutgring, Lafayette, both of LA (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/573,601

(22) Filed: May 18, 2000

(51) Int. Cl.$^7$ ............... C09K 7/04; E21B 7/04; E21B 21/01; E21B 37/00
(52) U.S. Cl. ............... 175/61; 166/312; 175/65; 175/66; 507/140; 507/927
(58) Field of Search ................... 175/40, 61, 62, 175/65, 66; 166/50, 267, 291, 312; 507/140, 269, 925, 927, 928; 423/554

(56) References Cited

U.S. PATENT DOCUMENTS

| | | | |
|---|---|---|---|
| 3,866,683 | * 2/1975 | Maly et al. | 166/291 X |
| 4,413,511 | * 11/1983 | Godbey | 175/66 X |
| 4,496,012 | * 1/1985 | Savins | 175/65 |
| 4,860,830 | * 8/1989 | Jennings, Jr. et al. | 166/312 |
| 5,320,172 | * 6/1994 | Jennings, Jr. | 166/291 |
| 5,462,118 | * 10/1995 | Jennings, Jr. et al. | 166/312 |
| 5,715,896 | * 2/1998 | Naraghi | 175/40 |
| 5,789,352 | * 8/1998 | Carpenter et al. | 166/291 X |
| 5,865,249 | * 2/1999 | Gipson et al. | 166/312 |
| 5,881,813 | * 3/1999 | Brannon et al. | 166/312 X |
| 5,984,011 | 11/1999 | Misselbrook et al. | 166/312 |
| 6,063,737 | * 5/2000 | Haberman et al. | 166/312 X |
| 6,073,696 | * 6/2000 | Ellis | 166/312 |
| 6,164,380 | * 12/2000 | Davis | 166/312 |
| 6,176,323 | * 1/2001 | Weirich et al. | 175/40 |

\* cited by examiner

*Primary Examiner*—George Suchfield
(74) *Attorney, Agent, or Firm*—Craig W. Roddy; Karen B. tripp

(57) ABSTRACT

A sweep material is disclosed comprising barium sulfate that has been ground and sieved, preferably in the range of about −95% 30 mesh to about +95% 100 mesh. The sweep material is added to and circulated with the drilling fluid during drilling of a deviated, directional or horizontal well to remove cuttings beds accumulated on the lower side of the well. After the drill cuttings are dislodged, the drilling fluid is sieved or screened to remove the barium sulfate to avoid a change in density of the fluid. The drilling operation does not have to be stopped during the sweep or cleaning treatment.

17 Claims, No Drawings

METHOD AND COMPOSITION FOR SWEEP OF CUTTINGS BEDS IN A DEVIATED BOREHOLE

BACKGROUND OF THE INVENTION

1. Field of the Invention

This invention relates to treatments for cleaning boreholes in a subterranean formation and particularly to removing cuttings beds or build-up of fines and smaller sized wellbore cuttings from a deviated borehole during a drilling operation.

2. Description of Relevant Art

Rotary drilling methods employing drilling apparatus having a drill bit and drill stem have long been used to drill wellbores in subterranean formations. Drilling fluids or muds are commonly circulated in the well during such drilling to serve a number of functions, including cooling and lubricating the drilling apparatus, counterbalancing the subterranean formation pressure encountered, and removing drill cuttings from the formation out of the wellbore. In removing drill cuttings from the well, drilling fluids suspend the cuttings and carry them to the surface for removal from the well.

Drilling deviated and horizontal wells has become increasingly common in the oil and gas industry. In drilling such wells, gravity causes deposits of drill cuttings, and especially fines or smaller sized cuttings, to build up along the lower or bottom side of the wellbore. Such deposits are commonly called "cuttings beds." As used herein, the term "deviated" with respect to wells shall be understood to include any well at sufficient angle or deviation off of vertical that cuttings beds tend to form during the drilling operation. "Deviated" wells shall be understood to include without limitation "angled," "high-angled," "oval," "eccentric," "directional" and "horizontal" wells, as those terms are commonly used in the oil and gas industry. The terms "well," "wellbore" and "borehole" are synonymous unless indicated otherwise.

Cleaning (i.e., removing drilling cuttings from) a deviated well, particularly drilled at a high angle, can be difficult. Limited pump rate, eccentricity of the drill pipe, sharp build rates, high bottom hole temperatures and oval shaped wellbores can all contribute to inadequate hole cleaning. In turn, inadequate hole cleaning can lead to cuttings beds build-up in the wellbore, as commonly used drilling fluids sometimes fail to remove cuttings from such cuttings beds while circulating through the wellbore.

Buildup of cuttings beds can lead to undesirable friction and possibly to sticking of the drill string and is especially a problem in Expanded Reach Drilling and in wells using invert emulsion type drilling fluids.

Well treatments or circulation of fluids specially formulated to remove these cuttings beds are periodically necessary to prevent buildup to the degree that the cuttings or fines interfere with the drilling apparatus or otherwise with the drilling operation. Two commonly used types of fluids that have been applied with limited success are highly viscous fluids, having greater viscosity than the drilling fluids being used in the drilling operation, and lower viscosity fluids, having less viscosity than the drilling fluids being used in the drilling operation. Commonly, the drilling operation must be stopped while such treatment fluids are swept through the wellbore to remove the fines.

Alternatively, or additionally, special viscosifier drilling fluid additives have been proposed to enhance the ability of the drilling fluid to transport cuttings but such additives at best merely delay the buildup of cuttings beds and can be problematic if they change the density of the drilling fluid.

A mechanical operation for removing cutting beds has also been used wherein the drill string is pulled back along the well, pulling the bit through the horizontal or deviated section of the well. Dragging the bit stirs up cuttings in the cuttings bed to better enable the drilling fluid to transport the cuttings up the well. However, such dragging the bit can damage its gauge side and dragging the bit while rotating further reams the hole. Also, such "wiper trips" are time consuming which increases drilling costs for the well and delays the ultimate completion of the well.

An alternative mechanical operation for removing cuttings beds has been proposed that employs drilling with coiled tubing and injecting fluid into the wellbore through the tubing at a flow rate exceeding the flow rate range used for drilling, as discussed in U.S. Pat. No. 5,984,011, issued Nov. 16, 1999, to John G. Misselbrook and Graham B. Wilde. However, this operation calls for special equipment and requires that drilling be stopped during the treatment, resulting in delays and increased drilling costs.

There continues to be a need for improved methods and materials for removing deposits of fines and smaller cuttings or cuttings beds from the lower side of a deviated borehole.

SUMMARY OF THE INVENTION

The present invention provides a composition or a sweep material and a method for cleaning a deviated borehole or wellbore in a subterranean formation, particularly during drilling of said borehole. The material and method are particularly suited for removing from the borehole small cuttings that tend to build up to comprise cuttings beds. The sweep material comprises a weight material, preferably barium sulfate, that has been ground and sieved to a specific grind size sufficiently small to be suspendable in the drilling fluid and generally harmless to the fluid pumping apparatus but sufficiently large to be screened out of the drilling fluid, preferably by the principal shale shaker for the drilling operation.

In the method of the invention, the sweep material of the invention is added to the wellbore drilling fluid, directly or in a carrier fluid compatible with said drilling fluid. The sweep material is circulated in the well, where it dislodges, suspends or pushes drill cuttings, especially fines and smaller sized cuttings deposited on the lower side of the wellbore, or in cuttings beds, to the surface of the well. The sweep material is then removed from the drilling fluid, preferably by sieving or screening, so the drilling fluid may be returned to the wellbore without significant change in density.

DETAILED DESCRIPTION OF THE PREFERRED EMBODIMENTS

The method and composition of this invention improve the sweep of fines and small drill cuttings or cuttings beds for removal from deviated wellbores and especially from the bottom or lower side of such wellbores. The invention also provides more efficient cleaning of the wellbores during drilling than available with known special treatment fluids, enabling such cleaning to be conducted without stopping the drilling operation.

The composition of the invention comprises a weight material for use as a sweep material, such as, for example, and preferably, barium sulfate, that has been ground and sieved to a size range sufficiently small to be suspendable in drilling fluid and generally harmless to the pumping apparatus for the drilling fluid but sufficiently large to be screened out, preferably by the principal shale shaker for the drilling operation. For example, such a suitable size range or particle size distribution (PSD) of weight material for use as a sweep material or for sweeping drill cuttings from a deviated or horizontal wellbore is from about 95% passes through when sieved through about 30 mesh to about 95% retention when sieved through about 100 mesh. Other materials may be used in addition to or in substitution for the barium sulfate, as a sweep material for this invention, provided the materials are capable of being ground and sieved to a specific size and are capable of maintaining this size under well drilling conditions, particularly high rotating conditions. Also, the sweep material for this invention should preferably be inert or should preferably not significantly dissolve into the drilling fluid or otherwise alter the rheological characteristics of the drilling fluid or damage the subterranean formation by contact with it in the wellbore. It is critical that the particle size distribution (PSD) of the sweep material be maintained to ensure the sweep material can be pumped through the wellbore with the drilling fluid, preferably at an increased density of about one and one half pounds per gallon, and then screened to ensure the drilling fluid returns at least substantially or effectively to its original density.

The invention is suitable for use in wells for which either water, oil, or synthetic based drilling fluids are being used. The composition of the invention should be comprised of a material compatible with said drilling fluids.

In the method of the invention, the composition of the invention may be added directly to the drilling fluid selected for or being used in the drilling operation or the composition of the invention may be added to another fluid with sufficient viscosity, density and volume to suspend or carry the composition into the wellbore. If such a carrier fluid is used, it should be compatible with the drilling fluid and not change the characteristics of the drilling fluid.

The quantity of the composition of the invention added directly or indirectly to the drilling fluid should be an amount that weighs more than the existing drilling fluid system for a volume sufficiently large to cover a certain portion of the borehole, while allowing the drilling fluid to still exhibit similar rheological properties as before addition of the composition. For example, when barium sulfate is used as the composition, a preferred amount is about 1½ to about 4 pounds per gallon of fluid to cover preferably about 300 to about 400 annular feet of borehole.

After adding the composition of the invention to the drilling fluid, the fluid is circulated in the wellbore, and allowed to "sweep," dislodge, pick-up, suspend, push or otherwise remove the fines, small cuttings and/or cuttings beds from the borehole and deliver them to the well surface. The composition of the invention and the cuttings are then removed from the drilling fluid so as to avoid a significant change of density in the drilling fluid. The composition of the invention is preferably removed from the drilling fluid by sieving or screening the drilling fluid, which may preferably be accomplished by the principal shale shaker in the drilling operation. The drilling fluid is then returned to circulation in the wellbore and the composition of the invention may be applied again to remove cuttings beds according to the method of the invention.

Such a "sweep" of the well may be immediately repeated if needed or desired. For example, if the drilled cuttings removed by the initial sweep are sufficiently noticeable and appreciable to give rise to a suspicion that cuttings build-up has occurred in at least a portion of the borehole, then an immediate subsequent repeat sweep may be desirable. Alternatively, or additionally, repeat sweeps may be made periodically during the drilling of the well.

Preferably, the composition of the invention is added to the wellbore for such a "sweep" treatment when the wellbore has accumulated drill cuttings or fines or cuttings beds not readily removed by the drilling fluids circulating in the wellbore during the drilling operation. Such accumulation inevitably occurs in drilling deviated wells and the method of the invention is particularly applicable to highly deviated or horizontal wellbores, where fines tend to accumulate on the bottom or lower side of the wellbore as the wellbore is drilled. Such fines may typically have a size range of about 2 to about 35 microns.

In drilling a highly deviated borehole, such as for example, a borehole having an angle greater than about 40 degrees with respect to vertical, the method of the invention is preferably employed about every 100 to about every 200 feet during drilling. In deviated wells that have angles less than about 40 degrees, sweeps with the composition of the invention or application of the method of the invention might only be needed about every 300 to about every 400 feet drilled, for example. Pump rate and rheological properties of the drilling fluid may also be adjusted to achieve maximum transport properties of the fluid to enhance the performance of the composition and method of the invention. The method of the invention may be applied without stopping the drilling operation.

The foregoing description of the invention is intended to be a description of preferred embodiments. Various changes in the details of the described composition and method can be made without departing from the intended scope of this invention as defined by the appended claims.

We claim:

1. A method for removing drill cuttings deposited in a deviated wellbore during a drilling operation for drilling said wellbore in a subterranean formation without stopping the drilling operation, said method comprising:

obtaining or preparing a fluid comprising a weight material that has been ground and sieved to a size sufficiently large as to be capable of being screened and sufficiently small as to be suspendable in the fluid and harmless to the pumping apparatus for pumping said fluid in said drilling operation;

injecting said fluid into the wellbore by adding it to the drilling fluid circulating through said wellbore without stopping the drilling operation;

circulating said fluid through the wellbore such that said drill cuttings are swept to the surface of the wellbore without stopping the drilling operation; and removing said weight material from said fluid.

2. The method of claim 1 wherein said weight material after sieving is comprised of particles such that about 95% of the particles pass through about 30 mesh and about 95% of the particles are retained by about 100 mesh.

3. A method for removing drill cuttings deposited in a deviated wellbore during a drilling operation for drilling said wellbore in a subterranean formation comprising:

obtaining or preparing a fluid comprising a weight material that has been ground and sieved to a size sufficiently large as to be capable of being screened and sufficiently small as to be suspendable in the fluid and harmless to the pumping apparatus for pumping said fluid in said drilling operation;

injecting said fluid into the wellbore by adding it to the drilling fluid circulating through the wellbore;

circulating said fluid through the wellbore such that said drill cuttings are swept to the surface of the wellbore; and removing said weight material from said fluid.

4. The method of claim 3 wherein said fluid prior to said injection, further comprises drilling fluid or a fluid compatible with said drilling fluid.

5. The method of claim 1 wherein said drill cuttings comprise cuttings beds lodged in a lower side of said wellbore.

6. The method of claim 1 wherein said weight material is barium sulfate.

7. The method of claim 1 wherein said weight material is removed from said drilling fluid by sieving or screening.

8. The method of claim 1 wherein said weight material is removed from said drilling fluid by a shale shaker.

9. A method for drilling a directional borehole in a subterranean formation comprising:

(a) circulating a drilling fluid in said borehole during the drilling of said borehole;

(b) periodically adding to said drilling fluid a sweep material that has been ground and sieved to a size capable of dislodging drill cuttings deposited on a side of said borehole while still being capable of being suspended in said drilling fluid and circulated with said drilling fluid without damaging equipment being used to circulate said drilling fluid;

(c) circulating said fluid comprising said sweep material in the borehole such that said sweep material sweeps through the borehole for about one trip down into, through and out of said borehole; and (d) removing said sweep material from said drilling fluid.

10. The method of claim 9 further comprising re-circulating said drilling fluid without said sweep material in said borehole during drilling.

11. The method of claim 9 wherein said sweep material is a weight material sieved to be larger than weight material used for weighting the drilling fluid and sufficiently large as to be capable of being screened out of said fluid such that said sweep material does not significantly change the density of said drilling fluid for the drilling operation.

12. The method of claim 11 wherein said sweep material is sieved such that about 95% of the particles comprising the sweep material pass through about 30 mesh and about 95% of the particles are retained by about 100 mesh.

13. The method of claim 9 wherein said drilling of said borehole is continued throughout steps (a)–(d).

14. The method of claim 10 wherein step (c) is repeated for an additional sweep of said sweep material through said borehole before steps (d) and (e).

15. The method of claim 11 wherein said sweep material is barium sulfate.

16. The method of claim 9 wherein cuttings beds are built up in said borehole during said drilling before said sweep material is added to said drilling fluid.

17. The method of claim 16 wherein said cuttings beds are removed by circulation of said sweep material.

* * * * *